United States Patent [19]

Halstead et al.

[11] Patent Number: 5,219,017
[45] Date of Patent: Jun. 15, 1993

[54] SLIDE MOUNTED HEATER ASSEMBLY

[75] Inventors: Gary A. Halstead, Lockport, N.Y.; Ronald C. Treloar, Paris, France

[73] Assignee: General Motors Corporation, Detroit, Mich.

[21] Appl. No.: 894,976

[22] Filed: Jun. 8, 1992

[51] Int. Cl.⁵ .......................... F28D 1/04; F28F 1/32; F28F 7/00; F28F 9/00
[52] U.S. Cl. ....................................... 165/41; 165/67; 165/78; 165/173; 165/176; 237/12.3 B
[58] Field of Search .................. 165/67, 78, 173, 176, 165/41; 237/12.3 B

[56] References Cited

U.S. PATENT DOCUMENTS

| 4,328,859 | 5/1982 | Bouvot | 165/78 |
| 4,341,346 | 7/1982 | Simpson | 165/173 |
| 4,401,157 | 8/1983 | Cadars | 165/78 |
| 4,465,124 | 8/1984 | Jacquet et al. | 165/78 |
| 4,482,011 | 11/1984 | Jacquet | 165/78 |
| 4,533,081 | 8/1985 | Forsting et al. | 165/78 |
| 5,009,262 | 4/1991 | Halstead et al. | 165/173 |
| 5,062,476 | 11/1991 | Ryan et al. | 165/173 |
| 5,125,454 | 6/1992 | Creamer et al. | 165/173 |

FOREIGN PATENT DOCUMENTS

| 0450619 | 10/1991 | European Pat. Off. | 165/173 |
| 3720483 | 1/1988 | Fed. Rep. of Germany | 165/173 |
| 3803599 | 8/1989 | Fed. Rep. of Germany | 165/176 |
| 944094 | 12/1963 | United Kingdom | 165/173 |

OTHER PUBLICATIONS

Ideas and applications in Design, Engineering Materials and Design vol. 21, No. 8 (Aug. 1977).

Primary Examiner—John K. Ford
Attorney, Agent, or Firm—Patrick M. Griffin

[57] ABSTRACT

A heater of a vehicle includes a pair of tank units with fluid tube passes and air centers formed therebetween. The tank units include a separate tank extrusion and header. The tank extrusion comprises a generally U-shaped extrusion with recesses provided on the exterior side of the side walls of the U-shaped extrusion. A mounting flange extends from one side wall of each tank extrusion. The header includes deformable tabs which extend over the recesses to allow clinching of the header to the tank extrusion. The mounting flanges slide within notches of a plastic case in the air module for sealing and securing the heater to the module.

1 Claim, 2 Drawing Sheets

SLIDE MOUNTED HEATER ASSEMBLY

TECHNICAL FIELD

The invention relates to the formation of a heat exchanger apparatus of the type having a pair of tank units with parallel tube passes extending therebetween for communicating fluid and having air centers for directing the inlet air stream of the vehicle about the tube passes. More particularly, the invention relates to a heater of the type for communicating coolant therethrough and for heating the air passing through the heating, ventilating and air conditioning module in an automobile.

BACKGROUND OF THE INVENTION

Traditionally, automotive heater units constructed from aluminum have been costly for low volume build because of the expense of dies or plastic molds to fabricate the tanks in such heater units. For each tank length for a specific application, separate dies or molds must be purchased. The use of extruded aluminum tanks reduces such tooling costs since only one inexpensive extrusion die is required to manufacture different length tanks for different capacity heater units.

Present heater cores include the tube passes and air centers wherein the air centers are connected to headers. The tanks are then placed against the headers at flat sealing perimeter surfaces therebetween. The assembly is brazed for forming a structurally cohesive core in which the headers are sealed to the tanks; the tubes are sealed to the header and the cooling fins or air centers are bonded to the tubes.

Thereafter, the heater core is assembled within the vehicle heating system in an air flow pass therethrough. In the past, a plastic case is provided to secure the heater core in the passage. Presently, the sides of the heater core are connected in the plastic case by a steel strap connected thereto and wrapped about each tank, and a polyurethane seal is located between the header and case to eliminate leakage. The plastic case is fastened to the module to secure the heater core into the vehicle heater case and air flow path.

The problem with this type of assembly is that the tanks are bulky and must be of greater width to receive the headers in the present form thereby undesirably increasing weight and size requirements. Furthermore, steel straps for securing the heater to the plastic case are difficult to assemble.

SUMMARY OF THE INVENTION

The invention includes a heat exchanger assembly for a motor vehicle having a plurality of tube passes and air centers for directing an air stream to exchange heat with fluid in the tube passes. The assembly includes the parallel tube passes forming fluid passages and the air centers connected to the parallel tube passes for conductively transferring heat from the fluid passages. A pair of tank units each has a fluid space communicating with the tube passes for the flow of fluid therethrough. Each of the pair of tank units more specifically includes an extruded tank and header. The extruded tank includes an extrusion having a base and two opposing side walls extending therefrom. The side walls have an interior surface forming the fluid space and an exterior surface with a recess formed therein. The header includes a slotted wall for receiving the tube passes and has deformable tabs extending therefrom placed over the exterior surface of the side and deformed into the recesses for securing the header to the extruded tank.

Also included is a heater assembly for a motor vehicle including a heater means having the tube passes, air centers and a pair of tank units and casing means located within an air flow module and including notches therein. The tank units include an extruded tank and header. The extruded tank includes an extrusion forming a base with two opposing side walls extending therefrom. A flange extends from each of the side walls beyond the base for slideable engagement with the notches to position the heater means into the casing for securing and sealing the heater means to the air flow module.

Also included is a method for making a heater which includes the steps of assembling a header to parallel tubes, assembling the tanks by placing the header adjacent the tank extrusion, and clinching the header into the tank recesses, brazing the assembly, and sealing the heater to the plastic case by sliding the heater within notches of the plastic case.

BRIEF DESCRIPTION OF THE DRAWINGS

Advantages of the present invention will be readily appreciated as the same becomes better understood by reference to the following detailed description when considered in connection with the accompanying drawings wherein.

DESCRIPTION OF THE PREFERRED EMBODIMENT

The invention relates to a heat exchanger assembly 10 for a motor vehicle. More particularly, the invention relates to a heat exchanger assembly 10 of the type including a heater 12 utilized in an air flow path an HVAC module 16 in a vehicle. It is to be understood that the heater 12 described herein may be utilized as other types of heat exchangers in various applications.

Figure 1:
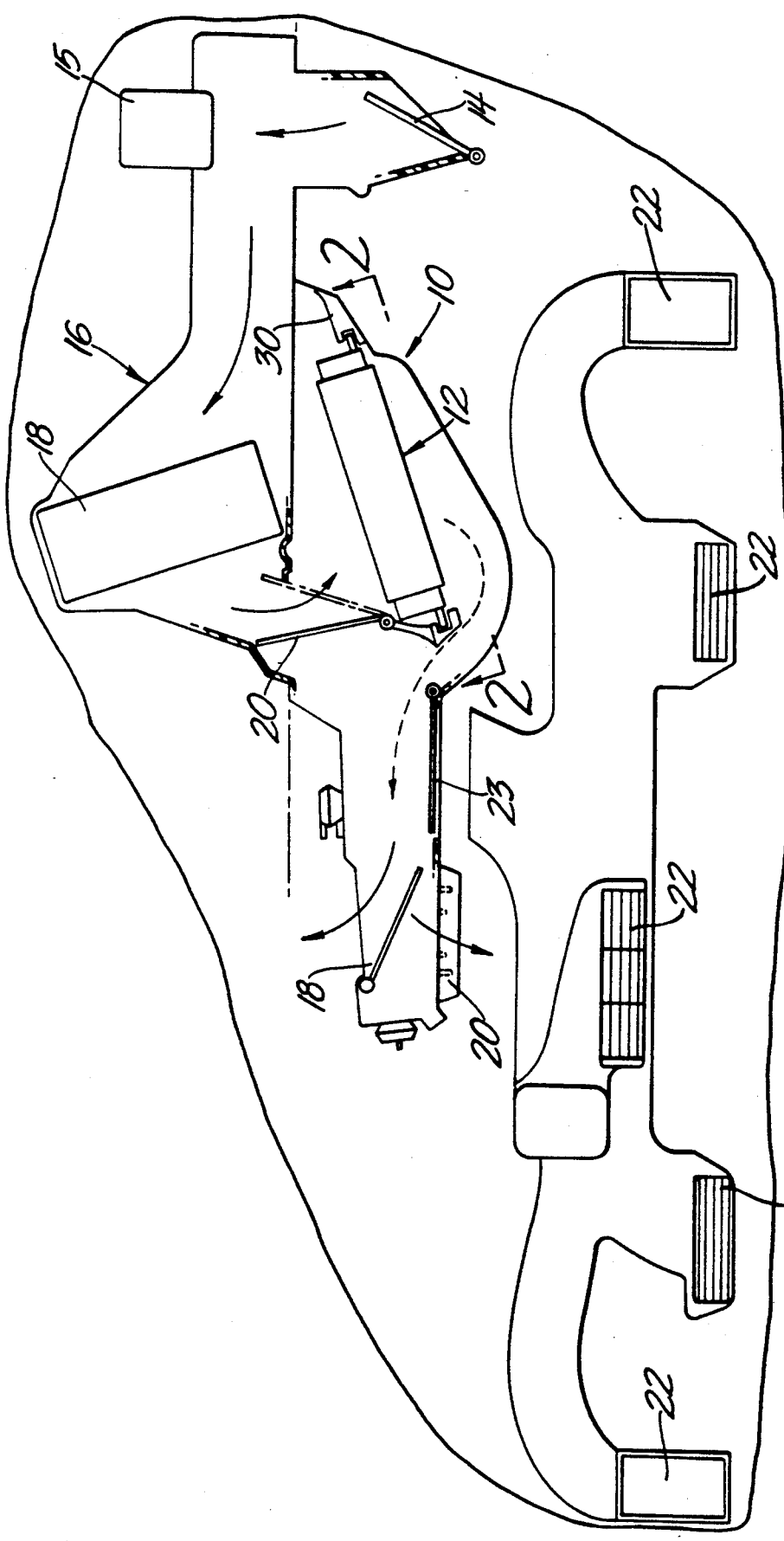
FIG. 1 is a schematic diagram of a heater, ventilating and air conditioning module (HVAC) for controlling air flow passage in a vehicle utilizing the subject invention.

As illustrated in FIG. 1, the heater 12 is placed within the air flow path or air module 16 of the vehicle. An valve 14 controls circulation of inside or outside air into the module 16. The air is forced by a blower 15 through the module 16 and through an evaporator core 18. Subsequently, the air is forced selectively through the module 16 either bypassing the heater 12 or flowing through the heater 12 by pivoting the temperature door 20. The air circulated through the heater 12 is heated thereby and directed to the interior compartment of the vehicle at the defrost outlet 18 under the control of a pivotal valve 19 or through floor outlets 20 or dash vents 22 under the control of the pivotal valve 23. The configuration of the module 16 and the control of the flow of air therethrough are commonly known in the art.

Figure 2:
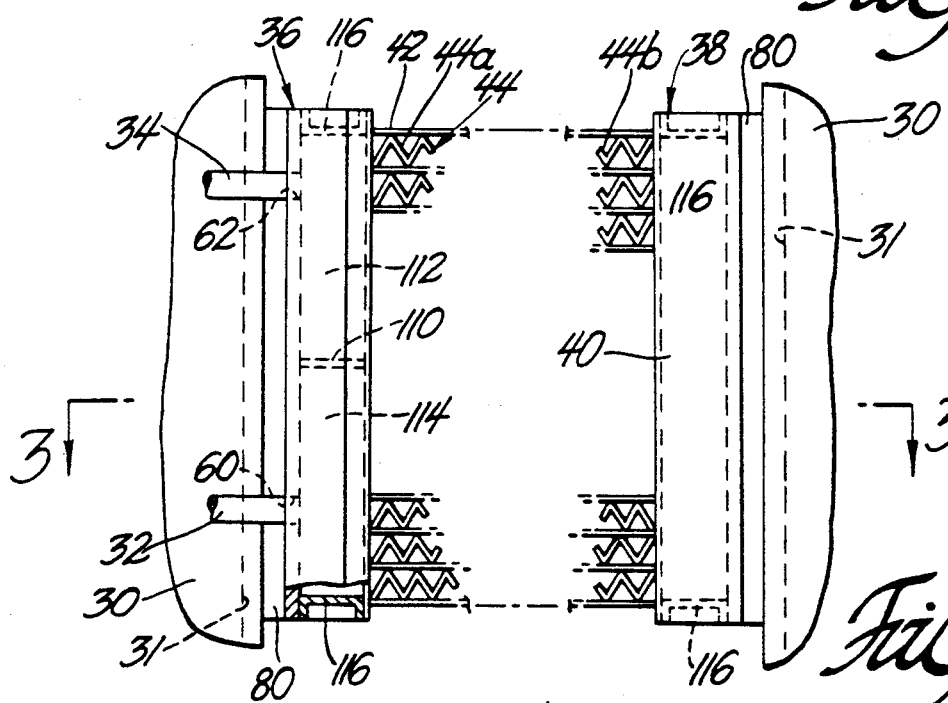
FIG. 2 is a partially broken away side view of the subject invention taken along lines 2—2 of FIG. 1.

As best illustrated in FIG. 2, the heater 12 is secured to the vehicle module 16 by a plastic case 30. The plastic case 30 may be molded integral with the module 16 or secured thereto by fasteners or the like. The plastic case 30 maintains the heater 12 in proper position and also seals the heater 12 in the module 16 to prevent bypass air flow between the heater 12 and the case 30. The case 30 includes a pair of opposing longitudinal notches 31, each on opposite sides of the air flow path. The connection between the plastic case 30 and the heater 12 will be subsequently discussed.

The heater 12 receives coolant from the engine block (not shown) at an inlet pipe 32 and returns the coolant to the radiator at an outlet pipe 34. The heater 12 includes a pair of tank units 36, 38. One of the tank units 36 has connected thereto the inlet 32 and outlet 34 pipes. The tanks 36, 38 each provide a fluid space 40 therein for containing fluid, e.g., coolant.

Figure 3:
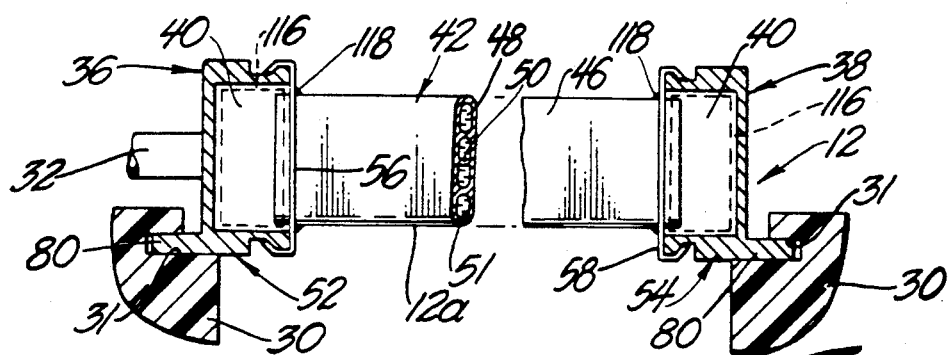
FIG. 3 is a cross-sectional view of the subject invention taken along lines 3—3 of FIG. 2.

A plurality of parallel tube passes 42 are connected between the pair of tank units 36, 38 for forming the fluid passage to communicate coolant between the tank units 36, 38. Also included are air centers 44 connected to each of the parallel tube passes 42 for conductively transferring heat from the fluid passages into air flow across sinusoidally bent segments 44a of the air centers 44 through air flow passages 44b therebetween. The tube passes 42 and air centers 44 are commonly known in the art. The tube passes 42 are formed by tubes connected between the pair of tanks 36, 38. As best seen in FIG. 3, each of the tubes is an extrusion, 46 with a flow passage 48 separated by a web 50 which serves to reinforce the tube extrusion 46 against the coolant flow therethrough. If desired, the passage 48 can have internal fins 51 extruded therein to improve heat transfer from the coolant air centers 44, hence to air flowing through passage 44b. The air centers 44 are sinusoidally curved sheet metal member with peaks and valleys bonded to the surface of the tube extrusions 46 in conductive heat transfer relationship therewith for removing heat from the coolant flow pass 48 during air flow through the air gaps formed by the air centers 44.

Each of the pair of tanks 36, 38 include an extruded tank 52, 54 and a separate header 56, 58. The tank units 36, 38 are identical except for apertures 60, 62 formed in the extrusion 52 of the first tank unit 36 to allow for connection with the inlet 32 and outlet pipes 34. The inlet pipe 32 and outlet pipe 34 may be welded or braze sealed to the extruded tank 52.

Figure 4:
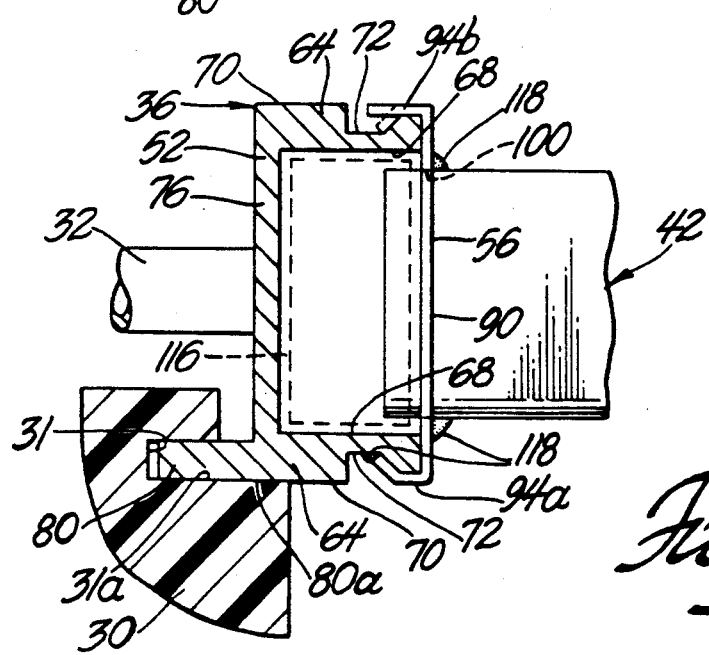
FIG. 4 is an enlarged cross sectional view of one tank unit and case of FIG. 2.

As best illustrated in FIG. 4, each extruded tank 52, 54 includes an extrusion forming two opposing side walls 64 having an interior surface 68 and an exterior surface 70. The exterior surface 70 includes recesses 72 formed therein. The extrusions 52, 54 are of a generally U-shaped configuration having a base 76 with the side walls 64 extending perpendicular therefrom. The base 76 of the first tank 52 includes the apertures 60, 62 formed therein.

The extrusions 52, 54 include a mounting flange 80 extending outwardly and perpendicular to the base 76 on one side thereof, and provide a longitudinal extension of one side wall 64 of the extrusion 52, 54. The mounting flanges 80 form a mounting rail for slideably mounting the heater 12 in the case 30, as subsequently discussed.

The headers 56, 58 include a slotted wall 90 with deformable tabs 94 extending perpendicular from the slotted wall 90. The slotted wall 90 is placed adjacent the extrusion 52, 54 with the tabs 94 over and adjacent the exterior surfaces 70 of the side walls 64 and over the recesses 72 therein. The tabs 94 are deformed against the recesses 72 to secure the header 56, 58 to the extruded tank 52, 54.

FIG. 4 illustrates the deformable tabs 94 wherein one tab 94a is indicated in the clinched position against the recess 72 and the other of the deformable tab 94b is in the open position as configured upon initial assembly prior to clinching.

The header 56, 58 includes slots 100 therein for receiving the tube extrusions 46. The exterior surface of the tube extrusions 46 includes cladding material thereon for sealing to the header during brazing thereof forming brazed joints 102. An alternative design would be to have cladding on the air center as is commonly known in the art.

The first extruded tank 52 includes an internal partition 110 therein for separating an inlet chamber 112 and an outlet chamber 114 in the first tank unit 36 for communication with the inlet pipe 32 and the outlet pipe 34, respectively. The partition 110 may be press fit and brazed thereto, as commonly known in the art. The second extruded tank 54 does not include a partition. The subject embodiment of the heater 12 is used for a two-pass core. However, it is to be understood that any number of passes may be used with added partitions.

The extruded tanks 52, 54 also include end caps 116 for providing enclosed and sealed chambers within the tank units 36, 38. The end caps 116 generally are configured as cup-shaped sheet metal press with cladding which are pressed in the two ends of the tank units 36, 38 and brazed to seal same. The headers 56, 58 and extrusions 52, 54 are of an aluminum material and include alloy cladding material, as commonly known in the art, to provide brazed joints 118 to seal the tanks, headers and tube passes during brazing.

The invention also includes a method of producing a heater assembly 10 including a heater 12. The method includes steps of assembling the header 56, 58 to the tube passes 42, assembling the tank units 36, 38 by placing the headers 56, 58 over the extruded tanks 52, 54 with the tabs 94 extending over the recesses 72, and then clinching the deformable flanges 94 against and into the recesses 72. The partition 110 and end caps 116 are press fit into the tank units 36, 38. The heater 12 is then brazed in a single step in which the parts are heated to 1100° F. to simultaneously braze from a structurally cohesive structure with sealed joints. The heater 12 is then sealed to the plastic case 30 by sliding the parallel flanges 80 into notches 31 formed within the case 30. The tank walls are extended on either side and at the inlet face 12a of the heater 12 to slide easily into the plastic case slots 31 to aid in assembly, therefor eliminating bracket and seal material.

The thickness of the heater 12 is reduced due the configuration of the clinching of the header 56, 58 to the extrusion 52, 54, and also in providing flat surfaces 80a along the flange 80 for connection to the case 30. The flanges 80 allow sliding into the plastic case 30 without screws, brackets or seals as used in the past. The flat surfaces 80a are located in sealing engagement with surface 31a of the case slots 31.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A heater assembly for a motor vehicle having an air flow module said assembly including:

casing means extending within the air flow module and providing two opposing notches therein;

heater means having parallel tube passes for forming fluid passages, air centers connected to said parallel tube passes for conductively transferring heat from the fluid passages, and a pair of tank units having fluid spaces communicating with said tube passes for flowing coolant therethrough;

said pair of tank units each including an extruded tank and header each said extruded tank including an extrusion forming a base with two opposing side walls extending therefrom and a flange extending from one of said two opposing side walls beyond said base for engagement with said notches to slideably mount said heater means into said casing means for securing heater means to the air flow module, and coacting surfaces on said flanges and said notches sealing said heater means with respect to said casing means to prevent bypass airflow therebetween.

* * * * *